3,052,622
HYDROREFINING OF WAXY PETROLEUM RESIDUES

Herbert L. Johnson, Media, Henry E. Reif, Drexel Hill, and Abraham Schneider, Overbrook Hills, Pa., assignors to Sun Oil Company, Philadelphia, Pa., a corporation of New Jersey
No Drawing. Filed May 17, 1960, Ser. No. 29,563
4 Claims. (Cl. 208—27)

This invention relates to the hydrorefining of waxy petroleum residues and more particularly to a process for obtaining highly satisfactory refined waxes from such residues.

Residual waxes which are obtained by the removal of waxes from petroleum residues frequently have unsatisfactory color and oxidation stability and other properties, so that it would be desirable to refine these waxes to obtain products having better properties. Various means have been proposed for accomplishing such refining but none is entirely satisfactory in all cases. According to the present invention a novel method of obtaining refined residual waxes is provided, which eliminates certain undesirable features of prior art operation.

According to the present invention a waxy petroleum residue is refined by contact with hydrogen in the presence of a hydrogenation catalyst, the temperature of contacting being within the approximate range from 600° F. to 825° F., and the pressure under which the contacting is performed being within the approximate range from 250 to 3500 p.s.i.g. From the residue which has been refined by such contacting, a residual wax having improved properties can be recovered by conventional dewaxing procedure. It has been surprisingly found that the product obtained by hydrorefining waxy petroleum residues and dewaxing the refined product is superior in certain important respects to residual waxes which have been hydrorefined after separation from a petroleum residue.

The present invention involves the contacting of a waxy petroleum residue with hydrogen in the presence of a hydrogenating catalyst. Any of the known hydrorefining catalysts are suitable for use according to the invention, e.g. various metals or oxides or sulfides thereof. Metals which can be used in one or more of these forms include cobalt, nickel, iron, manganese, chromium, molybdenum, magnesium, platinum, copper, zinc, vanadium, etc. Mixtures or combinations of such oxides or sulfides, e.g. cobalt molybdate, etc., can be employed. Other known hydrorefining catalysts can be employed. Any suitable catalyst base or support can be employed, e.g. bauxite, alumina, silica gel, clay, silica-alumina compositions, kieselguhr, pumice, charcoal, activated carbon, various aluminum silicates, etc. Other known bases can be employed. The catalyst may be prepared by any of the known methods for preparation of hydrorefining catalysts. Contact agents employed in the so-called contact method of hydrodesulfurization are contemplated as included within the concept of a hydrorefining catalyst for use according to the invention.

The contacting according to the invention can be performed by passing the waxy petroleum residue through a stationary bed of solid hydrorefining catalyst in the presence of hydrogen, or by any other suitable contacting method. The charge stock can be either in liquid or partially vaporized state. A slurry type of operation with filtration of the catalyst from the hydrorefined product can be employed. The hydrorefining can be performed in the presence of a suitable diluent for the charge stock, e.g. petroleum naphtha or other low viscosity hydrocarbon diluent, etc.

Preferred operation according to the present invention involves the passage of the charge stock through a stationary bed of hydrorefining catalyst at a space rate within the approximate range from 0.5 to 3 volumes of charge per volume of catalyst bed per hour; more preferred space rates are those within the range from 0.75 to 1.25. The hydrorefining temperature is within the approximate range from 600° F. to 825° F., preferably 750° F. to 775° F. The hydrorefining pressure is within the range from 250 to 3500 p.s.i.g., preferably 450 to 1750 p.s.i.g. The pressure to be used depends to some extent on the catalyst, and with some catalysts it is desirable to use pressures of at least 1000 p.s.i.g. With others, e.g. cobalt and molybdenum oxides, pressures in the range from 250 to 750 p.s.i.g. are satisfactory. Preferably the gases separated from the liquid products of the hydrorefining are recycled to the catalyst bed at a rate of 500 to 5000 standard cubic feet per barrel of charge, and preferably the volume percent of hydrogen in the recycle gases is 70 to 95%. More preferably the rate of recycle of the product gases is within the range from 2000 to 4000 standard cubic feet per barrel of charge.

The charge stock for the hydrorefining operation according to the invention is a straight run waxy petroleum residue, which is preferably substantially free of asphalt, having for example an asphaltene content not substantially greater than 0.1%. Generally the charge stock will be substantially entirely composed of constituents boiling above 600° F.

The charge stock treated according to the invention can have been previously deasphalted by conventional methods, e.g. by propane deasphalting, Duosol refining (propane and cresylic acid), or other known methods for deasphalting residual petroleum fractions.

In some instances, it may not be desired to dewax the hydrorefined waxy petroleum residue, in which case the beneficial effect of the operation according to the invention is to improve the properties of the waxy residue for whatever purpose is contemplated. However, it will generally be desired to dewax the hydrorefining residue to obtain a residual wax having improved properties and also a dewaxed oil having improved properties as a result of the hydrorefining. Any of the known methods for dewaxing petroleum residues can be employed in such dewaxing. Thus for example the residue can be dissolved in a dewaxing solvent such as methyl ethyl ketone, phenol or any of the other well known dewaxing solvents, and chilled in order to precipitate wax from the solution, the precipitated wax then being filtered from the solution. Other known dewaxing methods can be employed.

The following example illustrates the invention:

A waxy petroleum residue (16% wax) obtained by Duosol refining of topped crude derived from mixed base petroleum crudes was hydrorefined by passage through a bed of solid hydrogenation catalyst comprising nickel oxide on a bauxite carrier. The conditions of the hydrorefining were: 750° F., 1500 p.s.i.g., space rate 1, gas recycle rate about 4400 standard cubic feet per barrel. Gases including hydrogen sulfide and ammonia were stripped from the product, and the latter was stabilized by distillation at 10 mm. of Hg and 125° C. (liquid temperature) in a nitrogen current to remove low boiling constituents. The following table shows a comparison of the properties of the hydrorefining charge and stabilized product.

|  | Charge | Product |
|---|---|---|
| Saybolt viscosity at 210° F | 77.6 | 64.0 |
| API gravity at 60° F | 31.9 | 31.4 |
| Conradson carbon residue, wt. percent | 0.22 | 0.08 |
| NPA color | 6+ | 3+ |
| OD color | (76°F.) 149 | (120°F.) 25 |
| Refractive index at 20° C | 1.4847 | 1.4837 |
| Sulfur content, wt. percent | 0.09 | 0.03 |
| Nitrogen content, wt. percent | 0.017 | 0.001 |

This table shows that the hydrorefining substantially improved the color and other properties of the charge stock. The slight decrease in API gravity probably is attributable to the removal of light ends during the stabilization.

The hydrorefined product was dewaxed according to conventional procedure, using a mixture of benzene, toluene and methyl ethyl ketone as dewaxing solvent. The following table shows a comparison of the wax obtained (containing 12.6% oil) with wax (15.9% oil) separated from the waxy residue charge stock without intervening hydrorefining:

|  | Wax from Unrefined Charge | Wax from Hydrorefined Charge |
|---|---|---|
| NPA color | 8+ | 3+ |
| OD color | 216 | 41 |

The following table shows a comparison of the properties of the dewaxed oil from the hydrorefined product with dewaxed oil obtained from the unrefined charge stock:

|  | Oil from Unrefined Charge | Oil from Hydrorefined Charge |
|---|---|---|
| Refractive index at 20° C | 1.4856 | 1.4824 |
| NPA color | 6− | 3½+ |
| OD color | 140 | 40.2 |

This table shows that the oil portion of the waxy residue charge stock is also substantially improved in properties as a result of the hydrorefining.

The wax separated from the hydrorefined product in the above example was substantially odorless, whereas waxes obtained by dewaxing the charge stock and then hydrorefining the separated wax under conditions generally similar to those employed in the above example have been found to have an undesirable odor, apparently caused by products obtained during the hydrorefining operation. It is believed that relatively low molecular weight odor bodies are formed during the hydrorefining. If residual wax is hydrorefined after separation from the original waxy residue, these odor bodies contaminate the product wax. If the latter is subsequently distilled, the odor bodies are removed in the initial fraction. Distillation of high boiling waxes is undesirable, because it frequently results in cracking and degrading of the wax. In operation according to the invention the odor bodies are removed from the dewaxing solvent during the subsequent dewaxing and stripping of the hydrorefined waxy residue. The dewaxed oil obtained from the hydrorefined products was found in the above example to be essentially odorless.

In the above example the OD (optical density) colors were measured by means of a Beckman ultraviolet spectrophotometer using light having wave length of 525 millimicrons. Relatively high OD color values indicate relatively dark oils.

Generally similar results to those in the above example are obtained using other hydrogenation conditions, e.g. 725° F., 500 p.s.i.g., and space rate of 1, with a catalyst comprising cobalt and molybdenum oxides on alumina.

This application is a continuation-in-part of application Serial No. 512,586, filed June 1, 1955, now abandoned.

The invention claimed is:

1. Process for refining waxy petroleum residues which comprises: contacting a waxy petroleum residue with a solid hydrogenation catalyst in the presence of hydrogen at a temperature within the approximate range 600° F. to 825° F. and a pressure within the approximate range 1000 p.s.i.g. to 3500 p.s.i.g. and then separating and recovering substantially odor-free residual wax from the hydrorefined petroleum residue.

2. Process according to claim 1 wherein a waxy petroleum residue is passed through a stationary bed of hydrogenation catalyst at a space rate within the approximate range from 0.5 to 3 volumes of charge per volume of catalyst bed per hour.

3. Process according to claim 1 wherein the waxy petroleum residue was previously deasphalted by refining with propane and cresylic acid.

4. Process according to claim 1 wherein said recovering is effected by precipitating wax from a solution of the products in a dewaxing solvent.

References Cited in the file of this patent

UNITED STATES PATENTS 2,956,001 Spars et al. _____ Oct. 11, 1960